United States Patent
Goldberg et al.

(10) Patent No.: US 7,667,912 B2
(45) Date of Patent: Feb. 23, 2010

(54) RETRY AND RE-READ FOR WRITE SYNCHRONIZATION

(75) Inventors: Jason Seth Goldberg, Pittsburgh, PA (US); Mehmet Fatih Erden, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 274 days.

(21) Appl. No.: 11/773,213

(22) Filed: Jul. 3, 2007

(65) Prior Publication Data

US 2009/0009901 A1 Jan. 8, 2009

(51) Int. Cl.
*G11B 5/09* (2006.01)
(52) U.S. Cl. ....................................... 360/53
(58) Field of Classification Search ............ 360/53, 360/31, 48, 51, 55, 58, 77.08, 75; 369/30.21, 369/275.1, 30.12; 375/340; 430/270.18
See application file for complete search history.

(56) References Cited

U.S. PATENT DOCUMENTS

| | | | | |
|---|---|---|---|---|
| 5,345,342 | A * | 9/1994 | Abbott et al. | 360/48 |
| 5,373,497 | A * | 12/1994 | Hanson | 369/275.1 |
| 5,373,513 | A | 12/1994 | Howe et al. | |
| 5,388,085 | A * | 2/1995 | Jaquette | 369/30.12 |
| 5,430,768 | A * | 7/1995 | Minuhin et al. | 375/340 |
| 5,455,721 | A * | 10/1995 | Nemazie et al. | 360/51 |
| 5,786,954 | A * | 7/1998 | Yada et al. | 360/51 |
| 5,828,510 | A * | 10/1998 | Yada et al. | 360/51 |
| 6,643,082 | B1 | 11/2003 | Belser | 360/48 |
| 6,643,083 | B2 * | 11/2003 | Korst et al. | 360/48 |
| 6,658,922 | B2 | 12/2003 | Leigh et al. | 73/105 |
| 6,751,035 | B1 | 6/2004 | Belser | 360/48 |
| 6,898,037 | B2 | 5/2005 | Leigh et al. | 360/55 |
| 6,999,258 | B2 * | 2/2006 | Molstad et al. | 360/48 |
| 7,092,183 | B2 * | 8/2006 | Ehrlich | 360/48 |
| 7,095,580 | B2 * | 8/2006 | Ehrlich et al. | 360/77.08 |
| 2002/0171969 | A1 | 11/2002 | Leigh et al. | 360/77.03 |
| 2006/0001999 | A1 * | 1/2006 | Ehrlich | 360/75 |
| 2006/0188819 | A1 * | 8/2006 | Takazawa et al. | 430/270.18 |
| 2007/0008864 | A1 | 1/2007 | Fan et al. | 369/126 |
| 2007/0217058 | A1 * | 9/2007 | Asakura et al. | 360/77.08 |
| 2008/0297936 | A1 | 12/2008 | Takeo | |
| 2009/0002868 | A1 * | 1/2009 | Mallary et al. | 360/55 |
| 2009/0003144 | A1 * | 1/2009 | Mallary et al. | 369/30.21 |

FOREIGN PATENT DOCUMENTS

| | | |
|---|---|---|
| CN | 101315801 A | 12/2008 |
| EP | 2008-174720 A2 | 5/1995 |
| JP | 7176139 A | 7/1995 |
| JP | 2008299975 A | 12/2008 |
| WO | 8607181 A1 | 12/1986 |

OTHER PUBLICATIONS

English translation of Japanese Office Action dated May 15, 2009 from corresponding foreign Application No. 2008-174720.

(Continued)

*Primary Examiner*—Fred Tzeng
(74) *Attorney, Agent, or Firm*—David D. Brush; Westman Champlin & Kelly, P.A.

(57) ABSTRACT

A method of detecting a cycle slip in a data string read from a bit patterned media and adjusting the data string to compensate for the cycle slip is disclosed. A system including a writeable data storage medium and a compensator configured to adjust data read from the data storage medium to compensate for a cycle slip during the writing of the data onto the storage medium is also disclosed.

20 Claims, 9 Drawing Sheets

OTHER PUBLICATIONS

Australian Patent Office Written Opinion dated Dec. 8, 2008 for corresponding Singapore Application No. 200805215-1, filed Jul. 3, 2008.

Australian Patent Office Written Opinion dated Jul. 15, 2009 for corresponding Singapore Application No. 200805215-1, filed Jul. 3, 2008.

* cited by examiner

RETRY AND RE-READ FOR WRITE SYNCHRONIZATION

FIELD OF THE INVENTION

The present invention relates generally to data storage systems and more particularly but not by limitation to the detection and correction of write errors during the data readback process.

BACKGROUND OF THE INVENTION

The density of data stored on data storage systems such as disc drives has increased steadily as the need for more and more data storage has continued to increase. To increase the overall density of the data stored on a given sized data storage device the amount of area devoted to each bit of data necessarily decreases. For example, data tracks that are configured to store a plurality of bits in a linear or arcuate arrangement become narrower and shorter. One of the consequences of increased areal density of data on a data storage system is that as the data tracks become smaller, the area devoted to each bit can become so small that the superparamagnetic limit is reached. At that point, the ability of the data storage medium to reliably store information is compromised.

One approach to increasing the areal density of material on data storage media is to utilize a bit pattern medium, which has a single grain of material for each bit of data stored on the data storage medium. The resultant data tracks are smaller than those using conventional approaches with multiple, but smaller grains of material for each bit are. However, each bit is isolated from every other bit in a data track, requiring that data writes be synchronized to prevent the introduction of errors.

Embodiments of the present invention provide solutions to these and other problems, and offer other advantages over the prior art.

SUMMARY OF THE INVENTION

In one aspect, a method for detecting a cycle slip in a data string read from a bit patterned media is disclosed. The method includes adjusting the data string to compensate for the cycle slip.

In another aspect, a method of examining a data string read from a data storage medium is disclosed. The data string is examined to detect whether a cycle slip occurred during the writing of the data string onto the data storage medium. The data string is then compensated for a detected cycle slip.

In still another aspect, a write data storage medium having a compensator is disclosed. The compensator is configured to adjust data read from the data storage medium to compensate for a cycle slip during the writing of the date onto the storage medium.

Other features and benefits that characterize embodiments of the present invention will be apparent upon reading the following detailed description and review of the associated drawings.

DETAILED DESCRIPTION OF ILLUSTRATIVE EMBODIMENTS

To facilitate an understanding of the present invention, it is described hereinafter in the context of specific embodiments. In particular, reference is made to the implementation of the invention in a patterned magnetic hard disk media for a hard disk drive. It will be appreciated, however, that the practical applications of the invention are not limited to these particular embodiments. Rather, the invention can be employed in other types of magnetic recording media, one example being magneto-optical hard disk media or other types of recording media.

Figure 1:
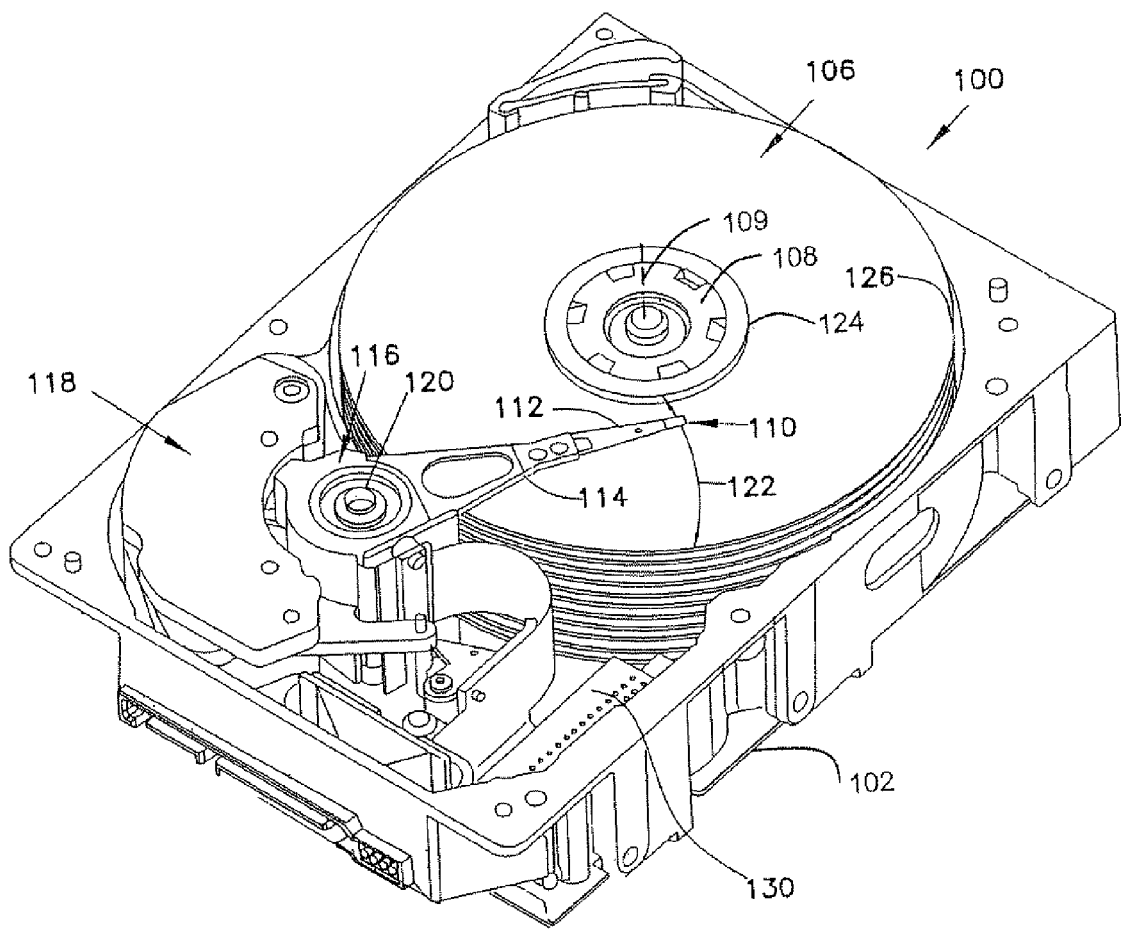
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface to read and/or write data onto the disc surface, which acts as a data storage medium. An interactive element (134 in FIG. 2) attached to the head slider 110 is positioned in close proximity to the disc surface. The interactive element is configured to read and/or write information on the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by interactive elements (134 in FIG. 2) located on sliders 110 and a host computer (not shown).

Figure 2:
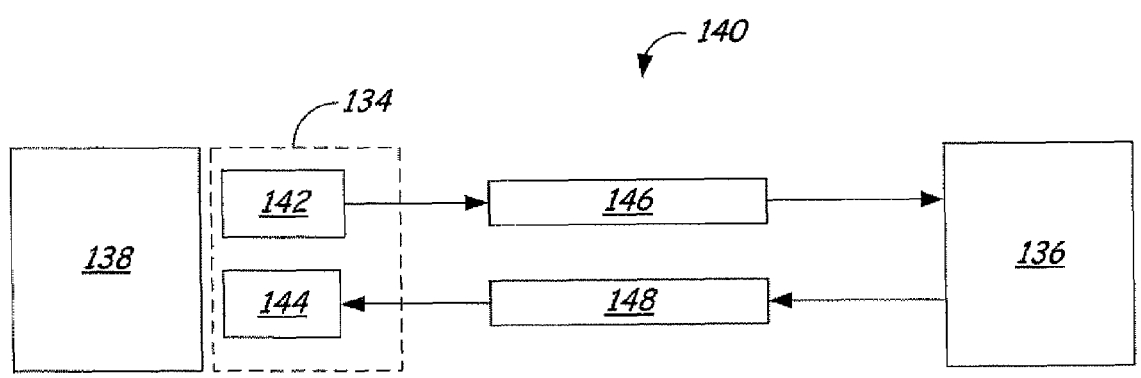
FIG. 2 is a block diagram illustrating read/write channel architecture for a disc drive of the type shown in FIG. 1

FIG. 2 illustrates a block diagram of an illustrative channel architecture 140. Channel architecture 140 provides communication paths between a host 136 and a data storage medium 138. The host 136 is preferably a computer or a computer system and the data storage medium is, for this illustrative example, a disc surface as described above. An interactive element 134 illustratively includes a read data head 142 and a write data head 144. Each of the read data head 142 and the write data head 144 are located in close proximity to the data storage medium 138. The read data head 142 reads data from the data storage medium 138. The data is then provided to a read channel 146, which compensates the data before it is provided to the host 136. Data that is to be written onto the data storage medium 138 from the host 136 is provided to a write channel 148, which compensates the data and sends it to the write data head 144, which writes the data onto the data storage medium 138.

Figure 3:
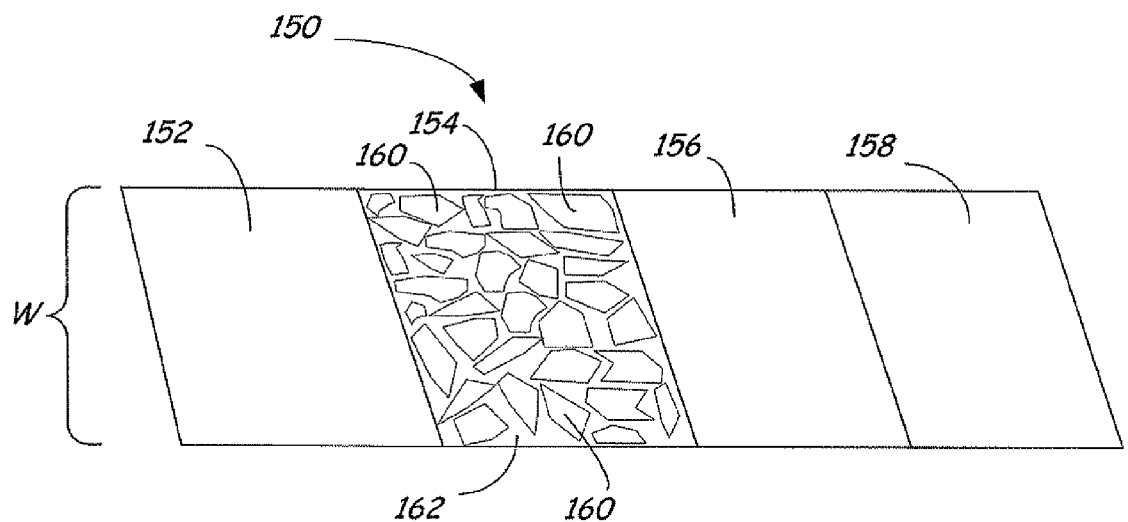
FIG. 3 is a diagram illustrating a data track from a data storage device having data bits with multiple grains of magnetic material.

Data stored on the surface of the disc drive is typically arranged in a series of data tracks. FIG. 3 is a schematic illustration a portion of a typical data track 150 that includes a plurality of data bits 152, 154, 156, and 158. Data bit 154 illustratively shows a plurality of grains 160 that are present in each of the data bits of data track 150. The grains 160 are separated from each other by non-magnetic spaces 162. The grains 160 collectively hold a magnetic orientation indicative of the value assigned to a particular data bit. As the size of the data track becomes smaller, the corresponding data bits also decrease in size. As the data bits decrease in size, the number of grains 160 in each data bit decreases in number. Eventually as the size of the data bit decreases, the number of grains decrease to the point to where the superparamagnetic limit is reached. In this case, the data bits can no longer reliably hold an orientation representative of a particular bit of data and therefore cannot reliably hold the data intended to be stored on them.

Figure 4:
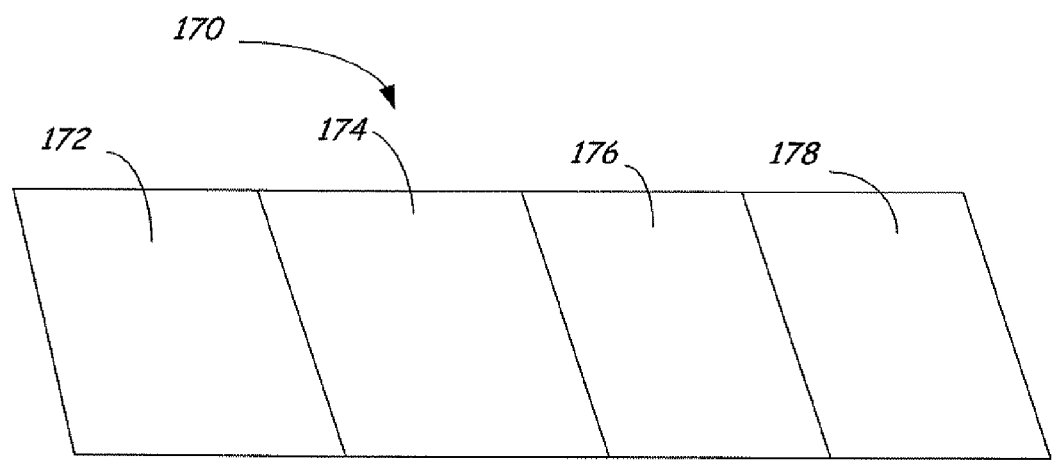
FIG. 4 is a diagram illustrating a data track having data bits with each data bit having a single grain of magnetic material.

FIG. 4 illustrates a portion of a data track 170, illustrating data bits 172, 174, 176, and 178. Each of the data bits 172-178 is illustratively formed with a single grain that covers the entire area of the data bit as opposed to the plurality of grains 160 illustrated in FIG. 3. As a result, the amount of magnetic material is increased for the same size of data track, thereby allowing for smaller data tracks without approaching the superparamagnetic limit. Because the data bits 172-178 each include the single grain arrangement that covers the entire area of the surface designated for a particular bit, it is necessary to provide non-magnetic spaces between the data bits so that an individual orientation can be applied to each bit. Thus, the data track 170, as illustrated in FIG. 4, necessarily requires the addition of non-magnetic spaces or else the entire data track 170 would function as a single data bit.

Figure 5A:
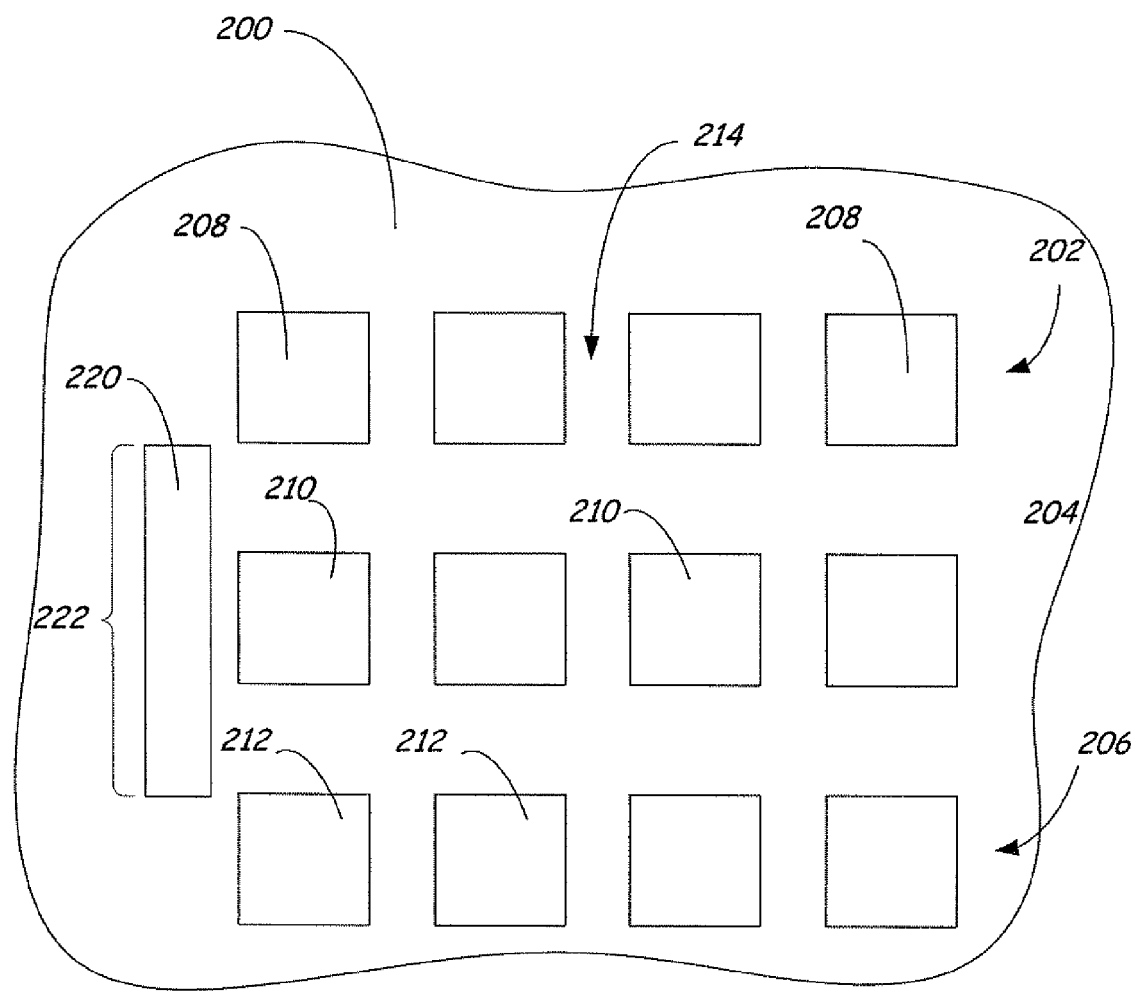
FIG. 5A is a schematic illustration of a portion of a data storage medium illustrating portions of data tracks utilizing a bit patterned media arrangement with a single row of data bits per data track.

FIG. 5A illustrates a portion of a data medium 200 showing a portion of a plurality of data tracks 202, 204, and 206. The first data track 202 has a series of data bits 208 that are arranged in a bit pattern with a non-magnetic space 214 between each of the data bits 208. Similarly, the second data track 204 has a plurality of data bits 210 arranged on data medium 200 in a bit pattern so that non-magnetic space 214 is positioned between the data bits 210. The same arrangement is illustrated for the third data track 206, which has a plurality of data bits 212 spaced apart by non-magnetic material 214. Interactive element 220 is shown positioned adjacent to second data track 204. The interactive element 220 is illustratively configured to be positioned in close proximity with the data bits 210 and the second data track 204 to read and/or write the information on each of the individual data bits 210 as the data medium 200 and the interactive element 220 move relative to each other.

Figure 5B:
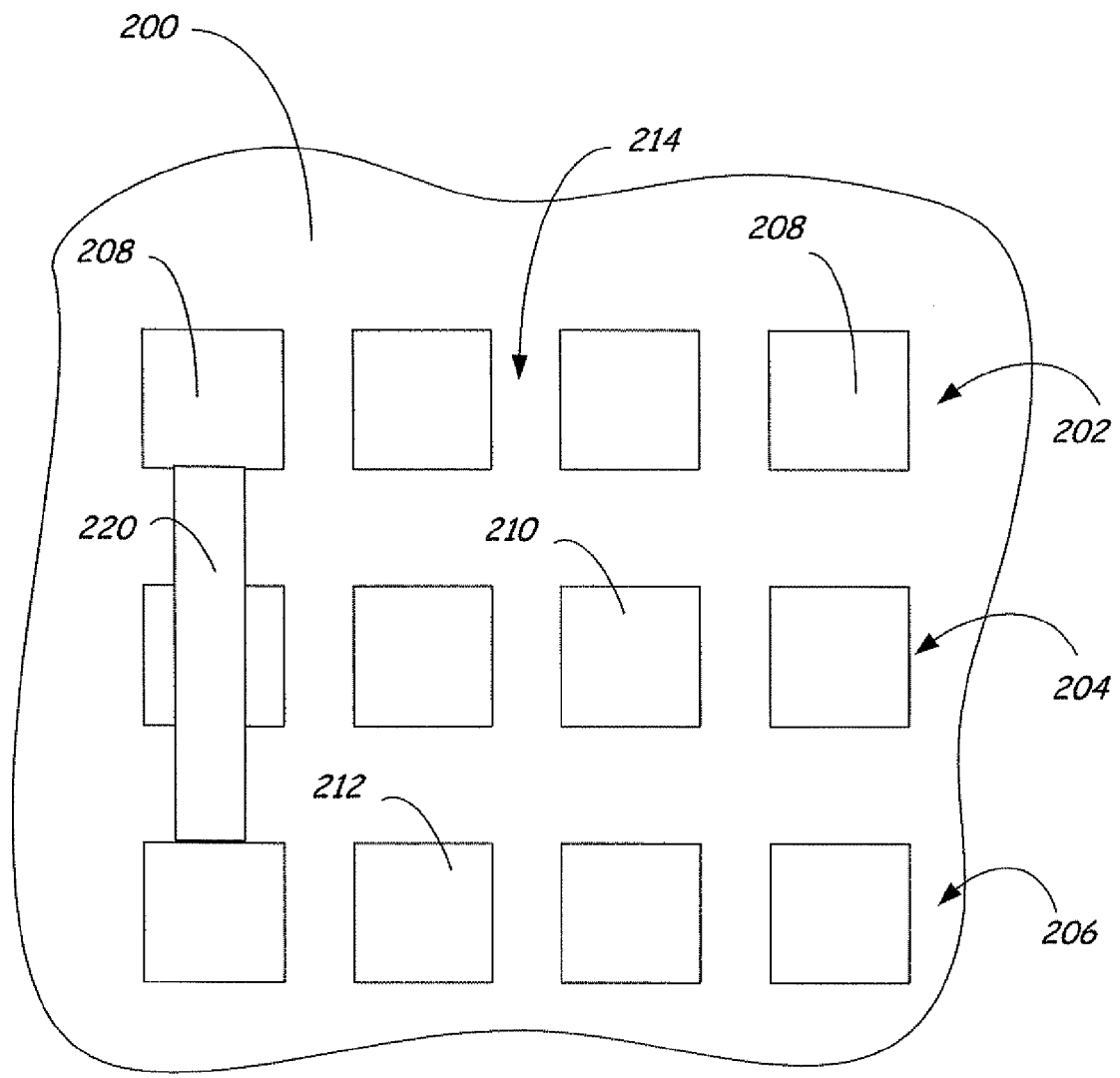
FIG. 5B is a schematic diagram illustrating the positioning of an interactive element positioned over one of the data tracks illustrated in FIG. 4A showing the potential for inter-track interference during read or write operations.

However, as is illustrated in FIG. 5B, when the interactive element 220 is positioned directly over the second data track 204, the arrangement of the first data track 202, the second data track 204, and the third data track 206 are closely positioned together. Therefore, when the interactive element 220 is positioned directly over a data bit 210 of the second data track 204 the interactive element may also be positioned over a portion of data bits 208 and 212 in the first data track 202 and the third data track 206. This can cause inter-track interference, which can cause a misread of data bit 210 and/or a miswrite of data bit 208, 210, or 212. It should be appreciated that the interactive element 220 has a length 222, which is similar to a width W of data track 150. By using the bit pattern media arrangement illustrated in FIGS. 4A and 4B, the width of the individual tracks has been reduced to the point where the interactive element 220 can no longer pass over just one data track. Of course, the data tracks can be spaced further apart, but that would reduce or eliminate the gain in areal density achieved by creating small data bits.

Figure 6A:
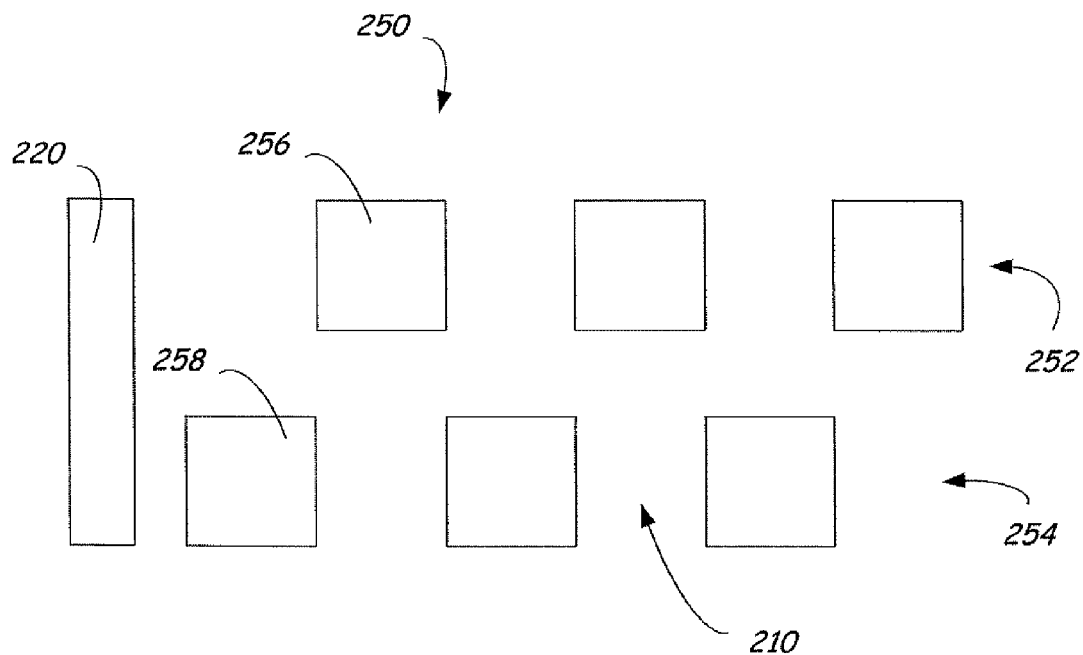
FIG. 6A is a schematic diagram illustrating a data track from a data storage device arranged using a bit pattern media with two rows of bits in a single data track.
Figure 6B:
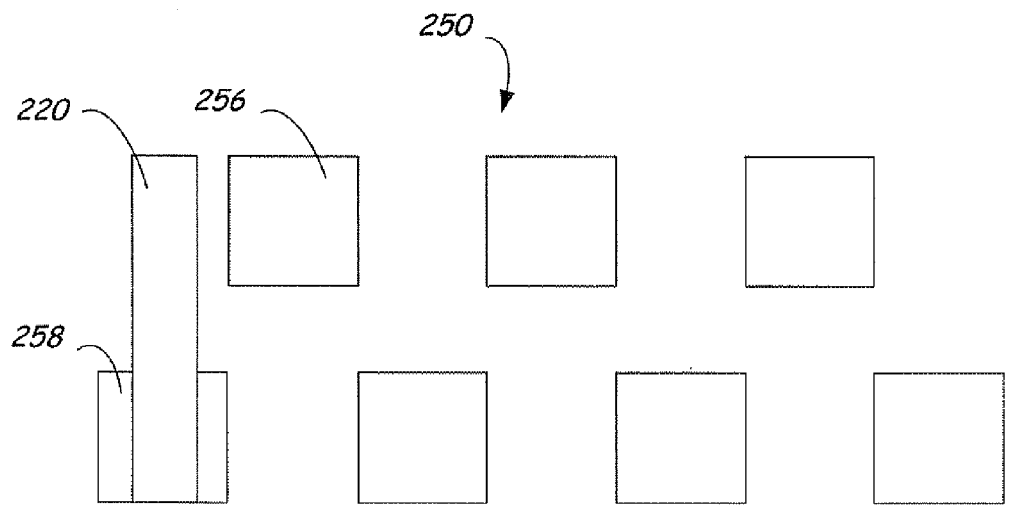
FIG. 6B is a schematic diagram illustrating the positioning of an interactive element over a bit in the data track of FIG. 5A.

FIG. 6A illustrates a portion of a data track 250, which employs a plurality of data bits in a first row 252 and a second row 254. It is understood that the data bits in each of the first row 252 and the second row 254 together comprise the data track 250. The data bit 256 in the first row 252 is linearly offset from or staggered with respect to the data bit 258 in second row 254 so that when the interactive element 220 is positioned over the data bit 258, it is not simultaneously positioned over any portion of the data bit 256. Thus, by providing for staggered rows 252 and 254, data bits 256 and 258 can be read by the data head 220 without any inter-track interference. Such an arrangement allows for more dense collection of data bits on a data track thereby increasing the density of information stored on a particular data medium as compared to the implementation of data track 150.

However, because the data bits 256 and 258 are positioned in discrete locations as opposed to on a conventional storage medium, that is material that includes a continuous track of magnetic material, it is necessary to synchronize the writing process to properly write data onto the data medium. When a data track includes a data medium that is not patterned, it is not necessary to synchronize the process of writing data onto the data medium, because the location of bits on the data medium is not fixed as it is with bit patterned media. Because of the fixed position of the data bits in the bit pattern media, however, any loss of synchronization during the write process can cause a so-called cycle slip. A cycle slip occurs when a loss of synchronization causes a particular bit not to be written in the proper location or to be written in consecutive locations, thereby shifting the remaining portion of a data string either left or right. When a cycle slip occurs, the remaining portion of a data string is unreliable and prone to errors so that the write process has effectively been compromised.

Figure 7:
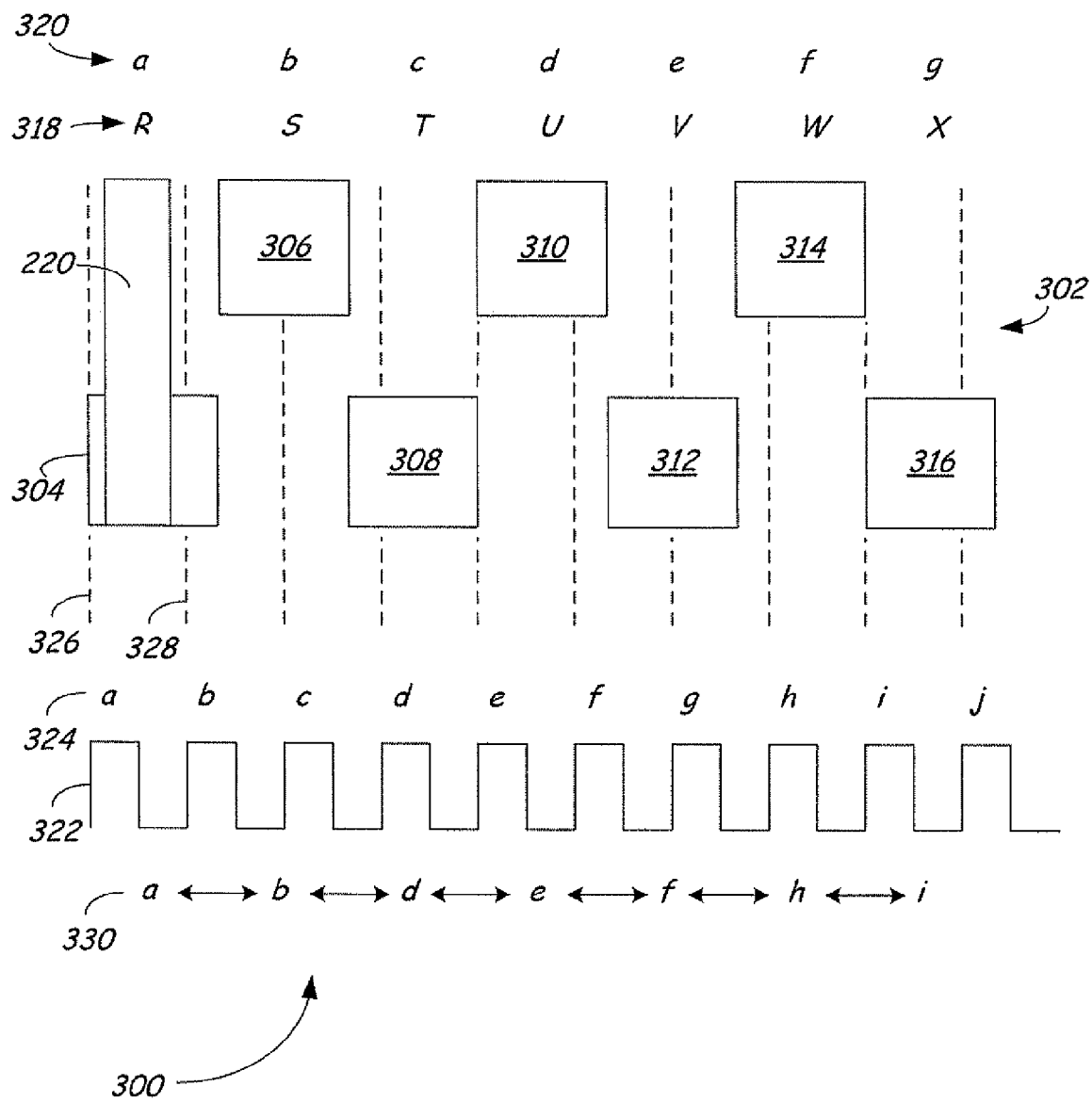
FIG. 7 is a diagram illustrating a timing pattern of write cycles to write data to the two-row data track illustrated in FIG. 5A.

FIG. 7 provides a diagram 300 of a write process onto a data track 302 that is similar to the data track 250 illustrated in FIG. 6A. Data track 302 includes a plurality of data bits 304, 306, 308, 310, 312, 314, and 316. Each of the data bits 304-316 includes a data bit previously written onto them which is represented by the symbols collectively shown as data bits 318. Thus, data bit 304 includes data represented as an "R," data bit 306 includes data represented as an "S," data bit 308 includes data represented as an "T," and so forth. At the end of the write cycle, it is intended that the data bits 304-316 include the data 320. Thus, data bit 304 should have a data bit represented as "a," data bit 306 should have a data bit represented as a "b," data bit 308 should have data "c," and so forth.

In this example, a write cycle pattern 322 provides that timing to cause bits to be written onto data bits 304-316 by the interactive element 220. The cycle pattern 322 shows not only a repeating period of cycles, but represents the position of the interactive element 320 with respect to the data bits 304-316 over time. A dash line extends vertically from the leading edge of each of the cycles in the pattern. For illustrative purposes, the pattern shown is not synchronized with the data bits 304-316. That is, the cycles are shorter than the time required for the interactive element to traverse one of the data bits. FIG. 7. If the write cycle 322 was synchronized with the data bits 304-316, the leading edge of each cycle would fall on a subsequent bit from the leading edge of the previous cycle. However, as can be seen, leading edges 326 and 328 of consecutive write cycles each end on the data bit 304. For the purposes of this example, each data bit will receive the data for the first write cycle that is in a high state when the head 220 passes over the particular data bit. Therefore, data bit 304 will have an "a" written onto it.

Given the pattern of write cycles and the rule described above, data bit 304 will have an "a" written onto it and data bit 306 will have a "b" written onto it. Data bit 308 will have a "d" written onto it because no part of the data bit for the write cycle that includes data bit "c" is in the high state when the write head 220 passes over the data bit 308. Data bit 310 will have an "e" written onto it, data bit 312 will have an "f" written onto it, data bit 314 will have an "h" written onto it, and data bit 316 will have an "i" written onto it. The write pattern on the data bit 304-316 is shown in data string 330. Comparing the data string 330 with the data string 320, it can be seen that two cycle slips were encountered. The data bit 308 was supposed to have a "c" written onto it and instead the "c" data bit was lost and the data string was shifted to the left so that data bit 308 has a "d" and data bit 310 has an "e." The second cycle slip occurs at data bit 314. Given the previous cycle slip, it is expected that at "g" would be written to the data bit 314. However, another cycle slip has occurred and data bit "h" was written to data bit 314. Furthermore, data bit "i" was written to data bit 316.

Thus, when the write cycle is not synchronized with the interactive element 220, such that write cycle is shorter than the time that the interactive element 220 spends positioned over a particular data bit, cycle slips will cause the remaining data to be shifted to the left. Alternatively, if the write cycle is longer than the period of time in which the interactive element 220 spends positioned over a particular data bit, the data stream will be shifted to the right.

Cycle slips generate a unique signature. Bits decoded in their properly functioning system have a very low probability of error, for example, less than one in $10^5$ bits. Bits after a cycle slip, however, have an error rate of about one in two. Because of the disparity of these error rates, the start of the cycle slip is identifiable to within a small number of bit locations. Once the location is approximately identified, by inserting or deleting one or more bits at this particular location, it is possible to shift the remaining data bits either left or right, which will reduce the number of errors seen in the data stream and therefore provide data correction for a cycle slip that could not otherwise be accomplished with standard error correction coding.

Figure 8:
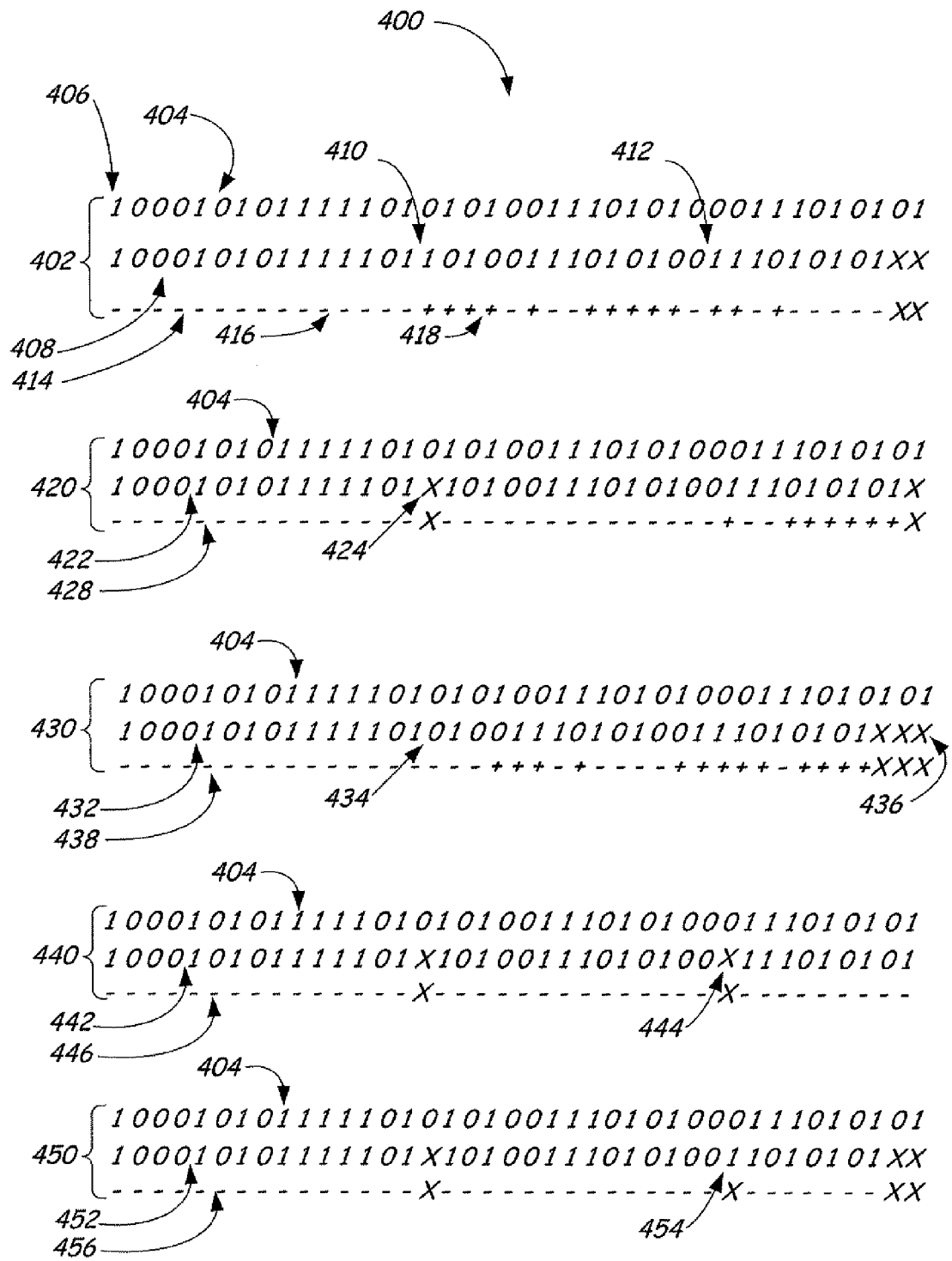
FIG. 8 is a diagram illustrating data patterns read from a data medium and created during the process of addressing cycle slips that occurred during a previous write operation.
Figure 9:
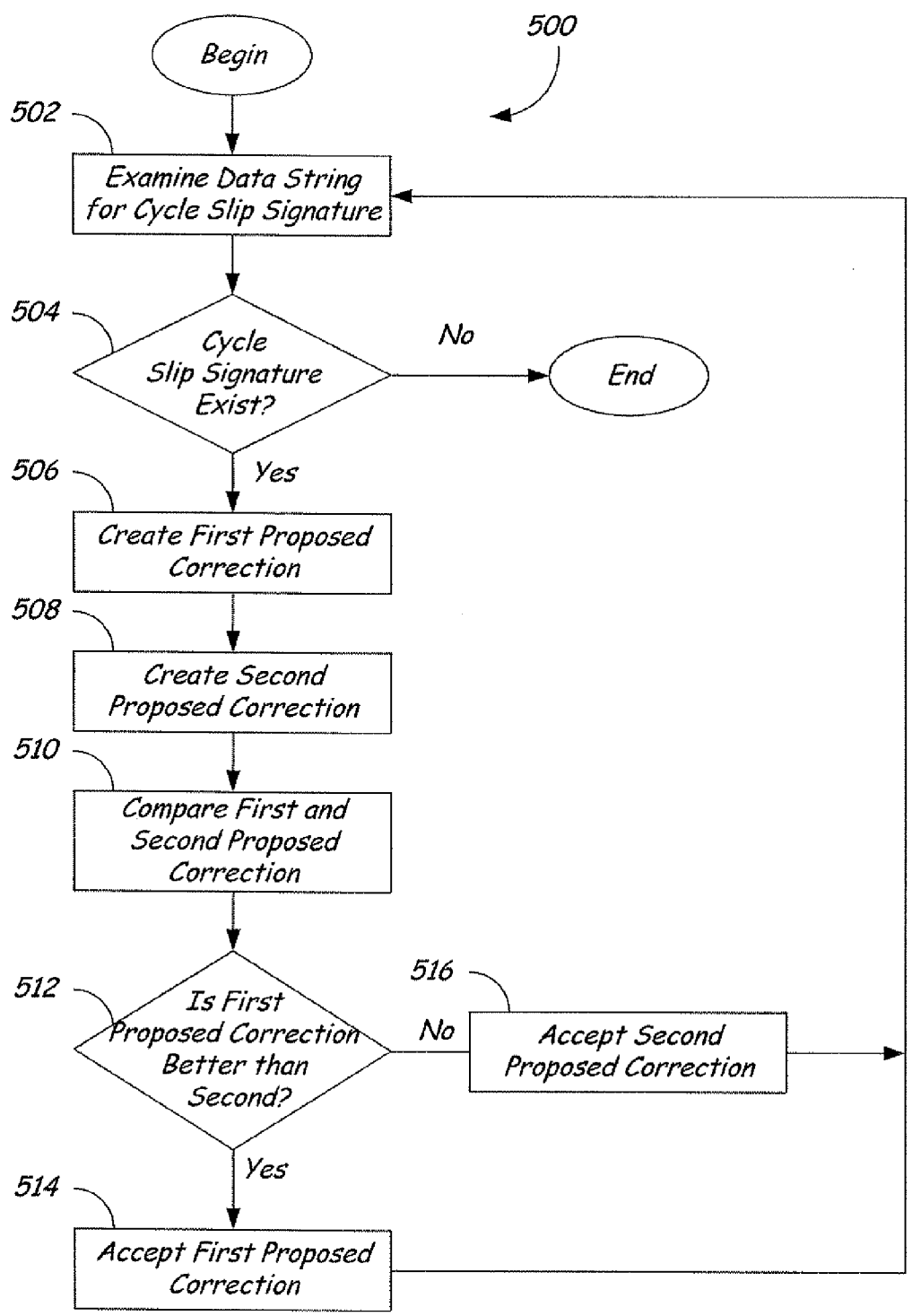
FIG. 9 is a flow diagram illustrating a method of addressing cycle slips created during a write operation according to one illustrative aspect.

FIGS. 7 and 8 illustrate an exemplary method of handling cycle slips in a data string stored on a disc storage medium that employs a bit pattern medium according to one aspect of the present invention. FIG. 9 illustrates a method 500 of handling cycle slips in data read from the data medium and FIG. 8 illustrates an example 400 of data having cycle slips therein. In one illustrative embodiment, a compensator such as a read channel (146 in FIG. 2) includes components capable of performing the method 500 described below. The example 400 is provided to understand the method 500 as it is applied to a particular data set. Example 400 is divided into a series of data groups, the first of these data groups being data group 402. Data group 402 includes a data string 404, which represents the desired string to be written onto a data medium. If there were no cycle slips in the data written onto the data medium beginning at first location 406, the data string would look as is presented in data string 404. Data string 408 represents an exemplary data string read from the data medium starting at location 406. For the purposes of this discussion it should be understood that the data string 408 indicates that two cycle slips occurred during the write process. One cycle slip is represented at location 410 and a second cycle slip is represented at location 412.

Method 500 begins by determining whether there has been a cycle slip in data that has been stored. The data string 408 is thus read from the data location 406 and it is checked to see if there are any errors in the data string. This is accomplished by using error correction coding (ECC) which is illustratively embedded in the data string 408 to be read. For the purposes of this example, it is to be assumed that any type of error correction coding can be used. Furthermore, it should be appreciated that while ECC can recognize and correct a small number of errors, it cannot correct a large number of errors and that it can determine approximate location of a cycle slip. A character string 414 is illustratively provided to show a schematic representation of the agreement of data bits in the data string 404 that was to be written to the data medium and the data string 408 that was actually read from the data medium. Data bits that are correctly read are signified by a "−" and data bits that differ from the expected data are indicated by a "+." Character string 414 is provided for illustrative purposes only and it is to be understood that the actual detection of cycle slip is determined by the use of error correction coding.

Returning again to block 502 of method 500, the first step in a method is to look for a cycle slip. The representation provided by character string 414 indicates a pattern of a large number of errors, which, as described above, is a signature for the occurrence of a cycle slip during the writing of data onto the data medium. At decision block 504, if there is no cycle slip detected the method 500 is ended. However, if there is a cycle slip detected, as in the case illustrated in example 400, a first proposed correction is created. This is illustrated at block 506. In one aspect of the invention, the creation of a first proposed correction is provided by inserting a bit at a location in the data string 408 where it is believed that a cycle slip where it is believed that cycle slip may have occurred. This is represented by data group 420 and FIG. 8. Group 420 includes a copy of the data string 404 and a first proposed data string 422. Data string 422 includes an inserted bit at location 424 and represented by "X." For the purposes of this discussion, the inserted bit "X" has been inserted at the exact location of the first cycle slip 410 illustrated in data group 402 above. As a result, the remaining members of the data string are shipped at one bit to the right and one unknown bit is shipped off the end of the string as is shown at location 426. It should be understood, however, that it is not necessary and may not be possible to find the exact location of a cycle slip. If the exact location of a cycle slip is not detected, there may be a small number of errors near the cycle slip, but a small number of errors can usually be corrected by the ECC decoder. Data string 428 represents the result in errors in the data string 422 after the data bit has been shifted to the right.

As above, bits that have errors detected are represented by "+" signs and bits that do not detect errors are represented by "−" signs.

Once the first proposed correction string has been created, a second proposed correction string is created, which is shown by block 508 of method 500. In one aspect of the invention, the second proposed correction string is created by deleting a bit from the data string 408 at the proposed site of the cycle slip and shifting the remaining data bits to the left. This allows for conditions where a cycle slip includes adding an extra bit or more accurately, where the same data bit is written on two consecutive data bits. It should be understood that in the example 400, the cycle slips are shown as deleting bits as opposed to adding additional bits but in other situations the cycle slips can include adding an additional bit.

Data group 430 of example 400 illustrates the deletion of a bit to the data string 408 at the spot where it is believed that a cycle slip occurred. Data group 430 includes the desired data string 404, as well as data string 432, which is a modified version of string 408. Data string 432 has a bit deleted at location 434 and the remaining bits of the data string 432 are shifted to the left. An additional bit is added to the end of the data string 432 and it is represented as an "X" at location 436. This data string 432 is illustratively passed through a detector to determine whether it has errors. Character string 438 is provided to illustrate the errors in data string 432. Once the first and second proposed correction strings 422 and 432 are created, the error rates of the first and second proposed correction strings 422 and 432 are compared to each other. This is represented at block 510. Reviewing example 400, it can be seen that the data string 428 has a better error rate as the data string 438. The actual comparison is provided by examining the strings by using ECC, the data strings 428 and 438 are provided here only for illustrative purposes.

At decision block 512 it is determined whether the first proposed correction is better than the second proposed correction. If the first proposed correction is the better option, the first string is accepted and this is represented at block 514. If the second string is the better solution, the second string is accepted at block 516. In this case, of course, the first proposed correction is the better option. From this point, the routine returns to block 502 to detect whether there are any further cycle slips. In this instance the string 428, which has been accepted as a better solution than the 438 string, has an additional signature for a cycle slip. Thus, at block 504, it is determined that a second cycle slip exists and the routine is repeated once again.

As described above, first and second proposals are created by adding a bit in the first instance and deleting a bit in a second instance. This is represented by data groups 440 and 450, respectively. Data group 440 has a data bit inserted at position 444 and the resultant data error analysis is provided at data string 446. Data string 452 shows a data bit deleted from location 454. The resulting error string is illustrated at data string 456. Once again, the data string 446, which illustrates a data bit being inserted, has a better error rate than the data string 456 and thus the first correction is determined to be the better option and thus is illustratively chosen over the data string 456. After the data string 446 is chosen, it is then checked to determine whether any further cycle slip (at block 502) and in this instance there would be none, and therefore the method 500 would be completed. Thus the data string 446 is the accepted data string, and it is sent through and ECC detector to determine whether there were any other errors in the data string.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the cycle slip handling system while maintaining substantially the same functionality without departing from the scope and spirit of the present invention. In addition, although the preferred embodiment described herein is directed to a cycle slip handling system for detecting and correcting errors created as a result of cycle slips during the process of writing data onto a storage medium, it will be appreciated by those skilled in the art that the teachings of the present invention can be applied to other error handling, without departing from the scope and spirit of the present invention.

What is claimed is:

1. A method, comprising:
   detecting a cycle slip in a data string read from a bit patterned media; and
   adjusting the data string to compensate for the cycle slip.

2. The method of claim 1, wherein adjusting the data string comprises:
   creating a first copy of the data string;
   determining an approximate location of the cycle slip in the first copy;
   inserting a data bit into the first copy at the approximate location of the cycle slip.

3. The method of claim 2, wherein adjusting the data string comprises creating a second copy of the data string and deleting a data bit from the second copy.

4. The method of claim 3, wherein adjusting the data string comprises:
   comparing the first copy with the second copy to determine which of the first copy and the second copy better compensates for the cycle slip; and
   replacing the data string with one of the first copy and the second copy.

5. The method of claim 1, wherein adjusting the data string comprises:
   creating a first copy of the data string;
   determining an approximate location of the cycle slip in the first copy;
   deleting a data bit from the first copy at the approximate location of the cycle slip.

6. The method of claim 1 and further comprising:
   detecting a second cycle slip in the data string; and
   adjusting the data string to compensate for the second cycle slip.

7. The method of claim 1, wherein detecting a cycle slip in a data string comprises:
   detecting a signature in the data string indicative of a cycle slip.

8. The method of claim 7, wherein detecting a signature includes detecting an error rate in a portion of the data string of about 50%.

9. The method of claim 1, wherein compensating for a cycle slip resulting from shorter than desired write cycles.

10. The method of claim 1, wherein compensating for a cycle slip resulting from longer than desired write cycles.

11. A method, comprising:

examining a data string read from a data storage medium to detect whether a cycle slip occurred during the writing of the data string onto the data storage medium; and modifying the data string to compensate for a detected cycle slip.

12. The method of claim 11 and further comprising:

determining an approximate location of the cycle slip by identifying a signature pattern in the data string.

13. The method of claim 12, wherein modifying the data string includes adding a data bit to the data string at the approximate location of the cycle slip.

14. The method of claim 12, wherein modifying the data string includes deleting a data bit from the data string at the approximate location of the cycle slip.

15. The method of claim 12 and further comprising:

comparing a first copy of the data string with a data bit inserted at the approximate location with a second copy of the data string with a data bit deleted at the approximate location to determine whether add or delete a data bit to the data string at the approximate location.

16. The method of claim 11 and further comprising:

examining the modified data string to determine whether a second cycle slip occurred during the writing of the data string onto the data storage medium.

17. A system comprising:

a writeable data storage medium; and a compensator configured to adjust data read from the data storage medium to compensate for a cycle slip during the writing of the data onto the storage medium.

18. The system of claim 17, wherein the compensator adds a data bit to a data string read from the data storage medium.

19. The system of claim 17, wherein the compensator deletes a data bit to a data string read from the data storage medium.

20. The system of claim 17, wherein the compensator is capable of detecting a cycle slip and determining whether the cycle slip is the result of a missing data bit or an extra data bit.

* * * * *

UNITED STATES PATENT AND TRADEMARK OFFICE
CERTIFICATE OF CORRECTION

PATENT NO. : 7,667,912 B2  
APPLICATION NO. : 11/773213  
DATED : February 23, 2010  
INVENTOR(S) : Jason Seth Goldberg et al.

Page 1 of 1

It is certified that error appears in the above-identified patent and that said Letters Patent is hereby corrected as shown below:

In The Claims

In Claim 15, column 10, line 1 after "whether", insert --to--.

Signed and Sealed this
Twenty-sixth Day of April, 2016

Michelle K. Lee
*Director of the United States Patent and Trademark Office*